(12) United States Patent
Bareiss et al.

(10) Patent No.: US 12,434,679 B2
(45) Date of Patent: *Oct. 7, 2025

(54) HYDRAULIC BLOCK FOR A HYDRAULIC UNIT OF A HYDRAULIC POWER VEHICLE BRAKING SYSTEM

(71) Applicant: Robert Bosch GmbH, Stuttgart (DE)

(72) Inventors: Alexander Bareiss, Immenstadt (DE); Andreas Weh, Sulzberg (DE); Juergen Tandler, Fuessen (DE); Martin Hagspiel, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 452 days.

This patent is subject to a terminal disclaimer.

(21) Appl. No.: 17/631,817

(22) PCT Filed: May 29, 2020

(86) PCT No.: PCT/EP2020/064963
§ 371 (c)(1),
(2) Date: Jan. 31, 2022

(87) PCT Pub. No.: WO2021/032331
PCT Pub. Date: Feb. 25, 2021

(65) Prior Publication Data
US 2022/0274574 A1    Sep. 1, 2022

(30) Foreign Application Priority Data
Aug. 19, 2019 (DE) ............... 10 2019 212 353.8

(51) Int. Cl.
*B60T 13/14* (2006.01)
*B60T 17/04* (2006.01)

(52) U.S. Cl.
CPC ............ *B60T 13/148* (2013.01); *B60T 17/04* (2013.01)

(58) Field of Classification Search
CPC ...... B60T 13/686; B60T 8/368; B60T 8/4081; B60T 13/148; B60T 7/04; B60T 2270/203; B60T 2270/306; B60T 8/3675
See application file for complete search history.

(56) References Cited

U.S. PATENT DOCUMENTS 6,193,329 B1 * 2/2001 Kanauchi ............... F04B 53/22
303/10
7,322,658 B2 * 1/2008 Hinz ....................... B60T 8/368
303/DIG. 10
(Continued)

FOREIGN PATENT DOCUMENTS

| CN | 204432786 U | 7/2015 |
|---|---|---|
| CN | 107791049 A | 3/2018 |

(Continued)

OTHER PUBLICATIONS

International Search Report for PCT/EP2020/064963, Issued Sep. 24, 2020.

*Primary Examiner* — Robert A. Siconolfi
*Assistant Examiner* — Mahbubur Rashid
(74) *Attorney, Agent, or Firm* — NORTON ROSE FULBRIGHT US LLP (57) ABSTRACT

A cuboidal hydraulic block of a hydraulic unit of a hydraulic power vehicle braking system. The cuboidal hydraulic block is for fastening optionally with one fastening side or an opposite fastening side to a splashboard of a motor vehicle, so that the hydraulic unit may be housed optionally with an electric motor on a right side or a left side of the hydraulic block in an engine compartment of the motor vehicle.

13 Claims, 4 Drawing Sheets

(56) References Cited

U.S. PATENT DOCUMENTS

| | | | |
|---|---|---|---|
| 7,769,519 B2* | 8/2010 | Kamiya | B60T 8/4031 |
| | | | 303/146 |
| 8,746,810 B2* | 6/2014 | Atsushi | B60T 8/368 |
| | | | 303/DIG. 10 |
| 8,925,440 B2* | 1/2015 | Michalski | B60T 8/368 |
| | | | 92/72 |
| 9,586,565 B2* | 3/2017 | Fellmeth | B60T 17/02 |
| 9,616,866 B2* | 4/2017 | Iyatani | B60T 13/686 |
| 9,868,423 B2* | 1/2018 | Weh | F04B 9/047 |
| 2008/0088176 A1* | 4/2008 | Ota | F15B 13/0835 |
| | | | 303/155 |
| 2008/0258544 A1* | 10/2008 | Iyatani | B60T 8/368 |
| | | | 303/10 |
| 2011/0273006 A1* | 11/2011 | Nakazawa | B60T 8/368 |
| | | | 303/10 |
| 2014/0216866 A1* | 8/2014 | Feigel | B60T 17/00 |
| | | | 188/156 |
| 2015/0298674 A1* | 10/2015 | Kratzer | B60T 13/146 |
| | | | 303/10 |
| 2018/0056955 A1* | 3/2018 | Weh | F15B 13/0814 |
| 2018/0326962 A1 | 11/2018 | Kim | |
| 2019/0031164 A1* | 1/2019 | Tandler | B60T 8/368 |
| 2019/0121385 A1 | 4/2019 | Lee | |
| 2020/0031327 A1* | 1/2020 | Mayr | F16H 57/0435 |
| 2021/0309197 A1* | 10/2021 | Weh | B60T 8/368 |

FOREIGN PATENT DOCUMENTS

| | | |
|---|---|---|
| CN | 108216178 A | 6/2018 |
| DE | 102014213732 A1 | 1/2016 |
| DE | 102016202113 A1 | 8/2017 |
| DE | 102016105232 A1 | 9/2017 |
| DE | 102017218301 A1 | 4/2019 |
| JP | 12015113034 A | 6/2015 |
| WO | 2016034794 A1 | 3/2016 |

* cited by examiner

HYDRAULIC BLOCK FOR A HYDRAULIC UNIT OF A HYDRAULIC POWER VEHICLE BRAKING SYSTEM

FIELD

The present invention relates to a cuboidal hydraulic block for a hydraulic unit of a hydraulic vehicle braking system.

BACKGROUND INFORMATION

German Patent Application No. DE 10 2016 202 113 A1 describes a narrow cuboidal hydraulic block for a hydraulic unit of a slip-controlled hydraulic power vehicle braking system, in which a main cylinder bore is incorporated continuously from one side to an opposite narrow side and a power cylinder bore is incorporated perpendicularly to the main brake cylinder bore also continuously through two opposing long sides of the hydraulic block. An electric motor is attached coaxially to the power cylinder bore at one of the two long sides of the hydraulic block. To fasten the hydraulic block to a splashboard of a motor vehicle in an engine compartment of the motor vehicle, the conventional hydraulic block includes a perforated plate-like fastening flange, which is situated coaxially to the main brake cylinder bore at one of the two narrow sides of the hydraulic block. The conventional hydraulic block also includes a blind hole as a receptacle for a pedal travel simulator perpendicular to both the main brake cylinder bore and perpendicular to the power cylinder bore in a lower transverse side of the hydraulic block, and blind holes for connecting to a brake fluid reservoir, which may be situated on an upper transverse side of the hydraulic block, in the upper transverse side of the hydraulic block. Connections for brake lines leading to hydraulic wheel brakes of the vehicle braking system are incorporated in the long side of the hydraulic block at which the electric motor is attached.

SUMMARY

In accordance with an example embodiment of the present invention, a hydraulic block is provided for a hydraulic unit of a hydraulic power vehicle braking system, which includes, in particular, a slip control. The key component of hydraulic power vehicle braking systems that include a slip control is a hydraulic unit including a hydraulic block to which hydraulic wheel brakes of the vehicle braking system are connected via brake lines. Slip controls are, in particular, anti-lock braking systems, traction control systems and/or dynamic stability controls/electronic stability programs, for which the abbreviations ABS, ASR and/or DSC/ESP are common. The latter are also referred to colloquially as "anti-skid controls." Slip controls are conventional and are not further elaborated here.

The hydraulic block is used to mechanically fasten and to hydraulically interconnect hydraulic components of the vehicle braking system or of its slip control. Such hydraulic components are, among other things, solenoid valves, check valves, hydraulic accumulators, damper chambers, pressure sensors and a power brake pressure generator, the power brake pressure generator usually including a piston-cylinder unit, which is housed in a power cylinder bore of the hydraulic block. A piston of the piston-cylinder unit of the power brake pressure generator is often also referred to as a plunger piston and the power cylinder bore as a plunger receptacle, plunger bore or the like. To generate pressure using external power, the piston of the power brake pressure generator is electromechanically displaced in the cylinder with the aid of an electric motor, which is attached to the outside of the hydraulic block via a threaded drive or generally a rotation-/translation-transition gear, a mechanical reduction gear, in particular, a planetary gear, being capable of being connected between the electric motor and the threaded drive or the transition gear. The power cylinder bore in the hydraulic block may form the cylinder of the power brake pressure generator or a cylinder, a cylinder sleeve or the like may be situated at or in the power cylinder bore. The power cylinder bore may also be considered to be a receptacle for the piston or for the piston-cylinder unit of the power brake pressure generator.

The hydraulic components are fastened in receptacles in the hydraulic block, which are usually designed as cylindrical through-openings or blind holes, in part with diameter gradations. "Interconnected" means that the receptacles or the hydraulic components fastened in them are connected by lines in the hydraulic block in accordance with a hydraulic circuit diagram of the vehicle braking system or of its slip control. The lines are typically drilled in the hydraulic block.

Fitted with the hydraulic components of the vehicle braking system or of its slip control, the hydraulic block forms a hydraulic unit, "fitted" meaning that the hydraulic components are fastened in the receptacles respectively provided for them.

The hydraulic block according to the present invention is cuboidal and preferably Cartesian drilled, in particular, made of metal. "Cartesian drilled" means that the receptacles for the hydraulic components and lines connecting them are placed in the hydraulic block in parallel and perpendicular to one another and to surfaces and edges of the hydraulic block. Individual slanting receptacles and/or lines are possible. "Perpendicular" refers here not only to straight lines, axes, bores, cylinders and the like, which or whose axes intersect each other perpendicularly, but also straight lines, axes, bores, cylinders and the like, which or whose axes are placed in parallel offset to a radial to another straight line, axis, bore, cylinder and the like in the hydraulic block.

The hydraulic block according to an example embodiment of the present invention includes a power cylinder bore in one side, the power cylinder bore being capable of being a blind hole or a through-hole passing through to an opposite side of the hydraulic block. The power cylinder bore is used to receive the piston of a power brake pressure generator, as has been previously explained above. The piston of the power brake pressure generator is often also referred to as a plunger piston. The piston is displaceable in the power cylinder bore for generating brake pressure using external power, namely for electromechanically generating brake pressure with the aid of an electric motor via a threaded drive or using another rotation-/translation-transition gear. A mechanical reduction gear may be provided between the electric motor and the threaded drive. The piston of the power brake pressure generator may be directly displaceable in the power cylinder bore or it is displaceable in a cylinder, in a cylinder sleeve or the like, which is situated at or in the power cylinder bore of the hydraulic block. An electric motor is situated at the outside of the hydraulic block on an opening of the power cylinder bore and preferably coaxially to the power cylinder bore. The side of the hydraulic block at which the electric motor is situated is referred to here as the motor side.

The hydraulic block is fastened, for example, to a splashboard in an engine compartment or also in a (front) luggage compartment or in a passenger compartment of a motor vehicle. The splashboard is part of a body of a motor vehicle and seals the passenger compartment below the windshield from the engine compartment or from the front luggage compartment. The hydraulic block is fastened at a side adjacent to the motor side of the hydraulic block, which is referred to here as the fastening side of the hydraulic block. According to an example embodiment of the present invention, the hydraulic block includes two opposing fastening sides, at which the electric motor may be optionally fastened, so that the hydraulic block may be optionally fastened to the left or to the right to, for example, the splashboard of the motor vehicle.

The possibility of situating the hydraulic block with the electric motor of the power brake pressure generator optionally to the left or to the right of the hydraulic block allows an installation of the hydraulic block to be adapted to the spatial conditions of, for example, the engine compartment of the motor vehicle, displacements of an internal combustion engine or of other drive motors, of a car battery and of other units situated in the engine compartment during an accident also capable of being taken into account, so that the internal combustion engine or other drive motors, the car battery and the other units preferably do not collide with the hydraulic block and the electric motor situated on the outside of the hydraulic block during an accident and, via the hydraulic block, deform the splashboard of the motor vehicle at which the hydraulic block is situated. To situate the electric motor to the left or to the right at the hydraulic block, the electric motor is not optionally situated at the motor side or at an opposite side of the hydraulic block, but the hydraulic block including the electric motor is situated at the motor side of the hydraulic block optionally with one of the two opposing fastening sides at, for example, the splashboard of the motor vehicle, resulting in the electric motor being positioned to the left or to the right at the hydraulic block. "To the left" and "to the right" refer to an installation position of the hydraulic block, for example, in the engine compartment of the motor vehicle.

In accordance with an example embodiment of the present invention, for fastening, the hydraulic block may, for example, include screw holes with internal threads in the two fastening sides. The screw holes in the two opposite fastening sides have preferably identical hole patterns, by which is meant an identical arrangement of the screw holes relative to one another. It is possible to place the screw holes in the fastening side, each of which is provided for or used for fastening. The screw holes or, in general, another means for fastening the hydraulic block may in general also be considered to be a fastening means (i.e., a fastener) of the hydraulic block. The hydraulic block may, for example, also include a fastening flange or another fastening means, which is attachable at one of the two opposing fastening sides of the hydraulic block, and with which the hydraulic block is attachable, for example, to the splashboard of the motor vehicle. The fastening flange forms a fastening means or part of a fastening means, for example, it, together with the screw holes in the two opposing fastening sides of the hydraulic block, forms the fastening means thereof.

A main brake cylinder bore in the hydraulic block is not necessary for the present invention, even though a main brake cylinder bore is preferably provided in the hydraulic block. The main brake cylinder bore is situated preferably perpendicularly to the power cylinder bore passing from the one fastening side to the opposite other fastening side in the hydraulic block. Screw holes for fastening the hydraulic block may be placed in parallel to the main brake cylinder bore around the latter in the two fastening sides in the hydraulic block.

The main brake cylinder bore is provided for one or for multiple pistons of a main brake cylinder for a muscle actuation or a power-assisted actuation of the vehicle braking system, i.e., one of the pistons is mechanically displaceable in the main brake cylinder bore with the aid of a (foot) brake pedal or of a (hand) brake lever. The piston or pistons may be displaceably accommodated directly in the main brake cylinder bore of the hydraulic block or a cylinder, a cylinder sleeve or the like is situated at or in the main brake cylinder bore, in which the piston or pistons are displaceable. The hydraulic block or a part of the hydraulic block surrounding the main brake cylinder bore forms a main brake cylinder.

If the hydraulic block includes a main brake cylinder bore, it preferably also includes a receptacle for a pedal travel simulator. The pedal travel simulator is a cavity in the hydraulic block according to the present invention, in which the pedal travel simulator may be situated, the pedal travel simulator being capable of being situated completely or partially in the receptacle. In the latter case, the pedal travel simulator projects from the hydraulic block. A piston of the pedal travel simulator may be displaceable directly in the receptacle or be displaceable in a cylinder, in a cylinder sleeve or the like, which is situated at or in the receptacle for the pedal travel simulator in the hydraulic block. The simulator piston is spring-biased, gas pressure-biased or is otherwise resiliently biased. It is attached to the main brake cylinder preferably via a solenoid valve, which may also be referred to as a simulator valve and is used to receive brake fluid from the main brake cylinder when the main brake cylinder is hydraulically separated from the vehicle braking system during a power actuation of the vehicle braking system by closing a separating valve, so that no brake fluid is able to be displaced from the main brake cylinder into the vehicle braking system. The pedal travel simulator enables a displacement of the piston in the main brake cylinder during a power actuation of the vehicle braking system, a force for displacing the piston as usual increasing with increasing displacement travel. Other designs of the pedal travel simulator and a receptacle adapted thereto for the pedal travel simulator in the hydraulic block are also possible according to the present invention. The receptacle for the pedal travel simulator is placed, in particular, in parallel to the power cylinder bore and thus perpendicularly to the main brake cylinder bore in the hydraulic block.

Other refinements and advantageous embodiments of the present invention are disclosed herein.

Other features of the present invention relate to the arrangement of receptacles for valves for controlling the wheel brake pressures in the wheel brakes and for slip control and their connection to one another, to the main brake cylinder bore, to the power cylinder bore, to the pedal travel simulator and to the connections for the wheel brakes and for the brake fluid reservoir, as well as to the arrangement of the main brake cylinder bore, of the receptacle for the pedal travel simulator, of the connection for the brake lines for connecting hydraulic wheel brakes to the hydraulic block and of the connections for a brake fluid reservoir.

All features described in the description and in the figures may be implemented individually alone or in basically arbitrary combination in specific embodiments of the present invention. Embodiments of the present invention, which include not all but only one or multiple features of a specific embodiment of the present invention, are, in principle, possible.

BRIEF DESCRIPTION OF THE DRAWINGS

The present invention is explained in greater detail below with reference to a specific embodiment represented in the figures.

The figures are simplified and schematized representations for explaining and for understanding the present invention.

DETAILED DESCRIPTION OF EXAMPLE EMBODIMENTS

Figure 1:
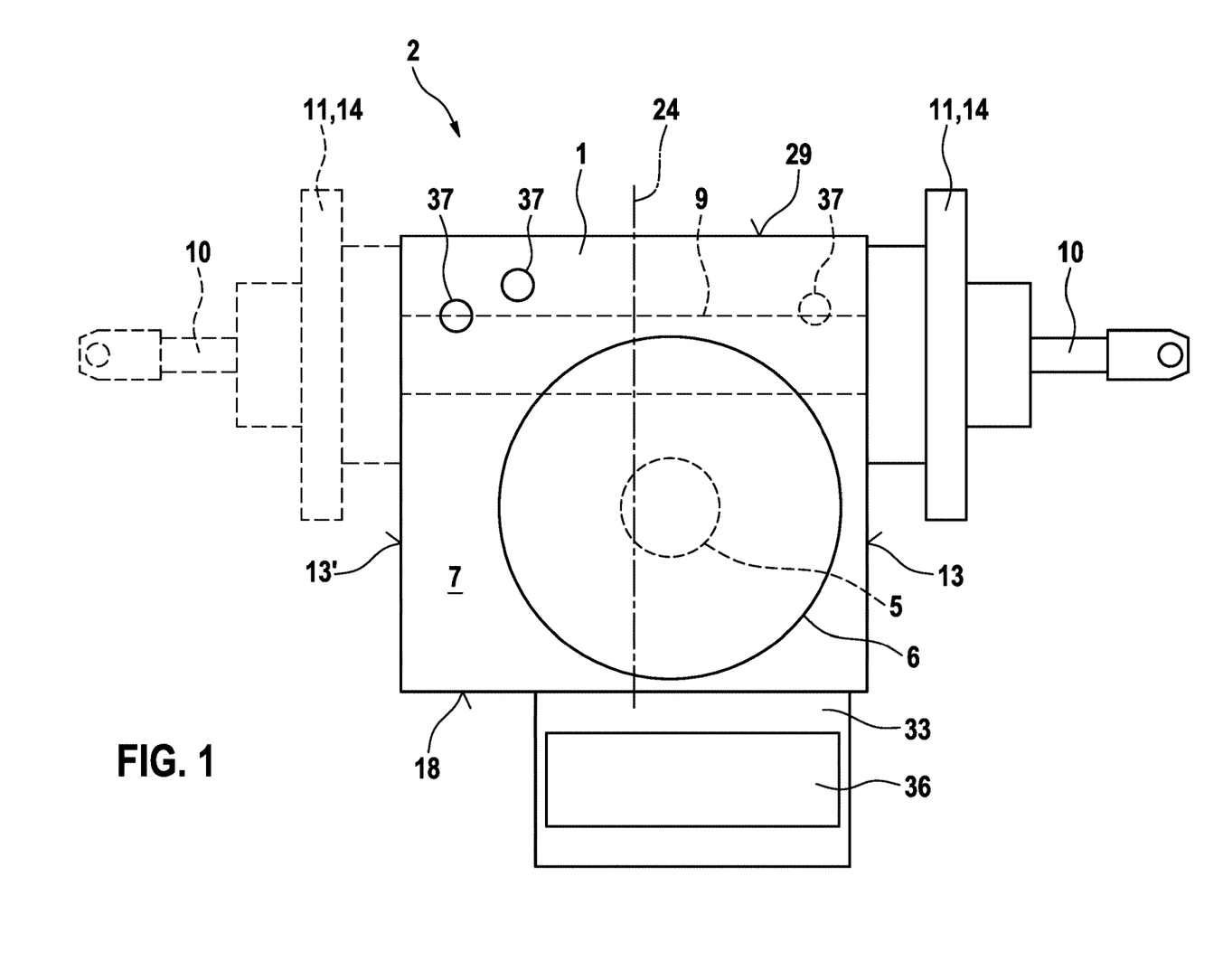
FIG. 1 shows a motor side of a hydraulic block according to an example embodiment of the present invention.
Figure 2:
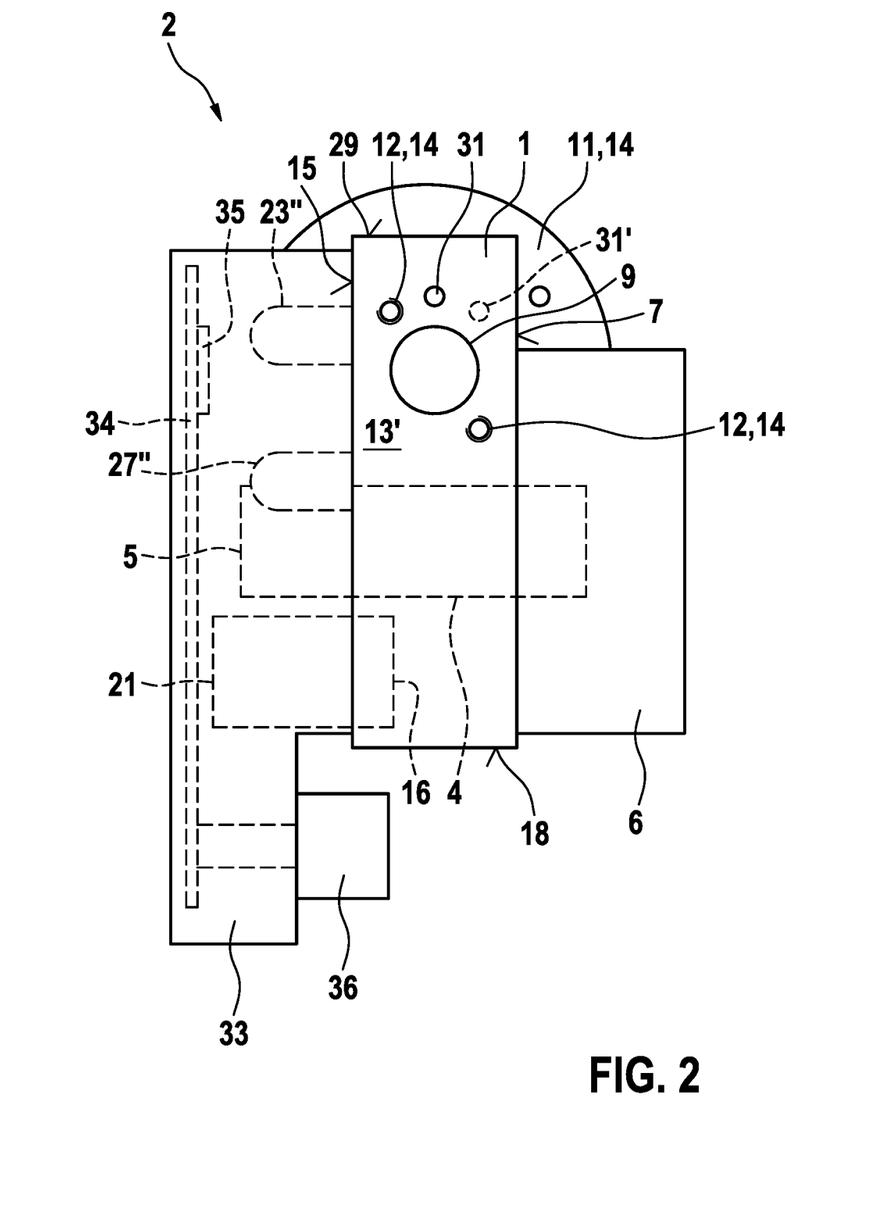
FIG. 2 shows a fastening side of the hydraulic block from FIG. 1.
Figure 3:
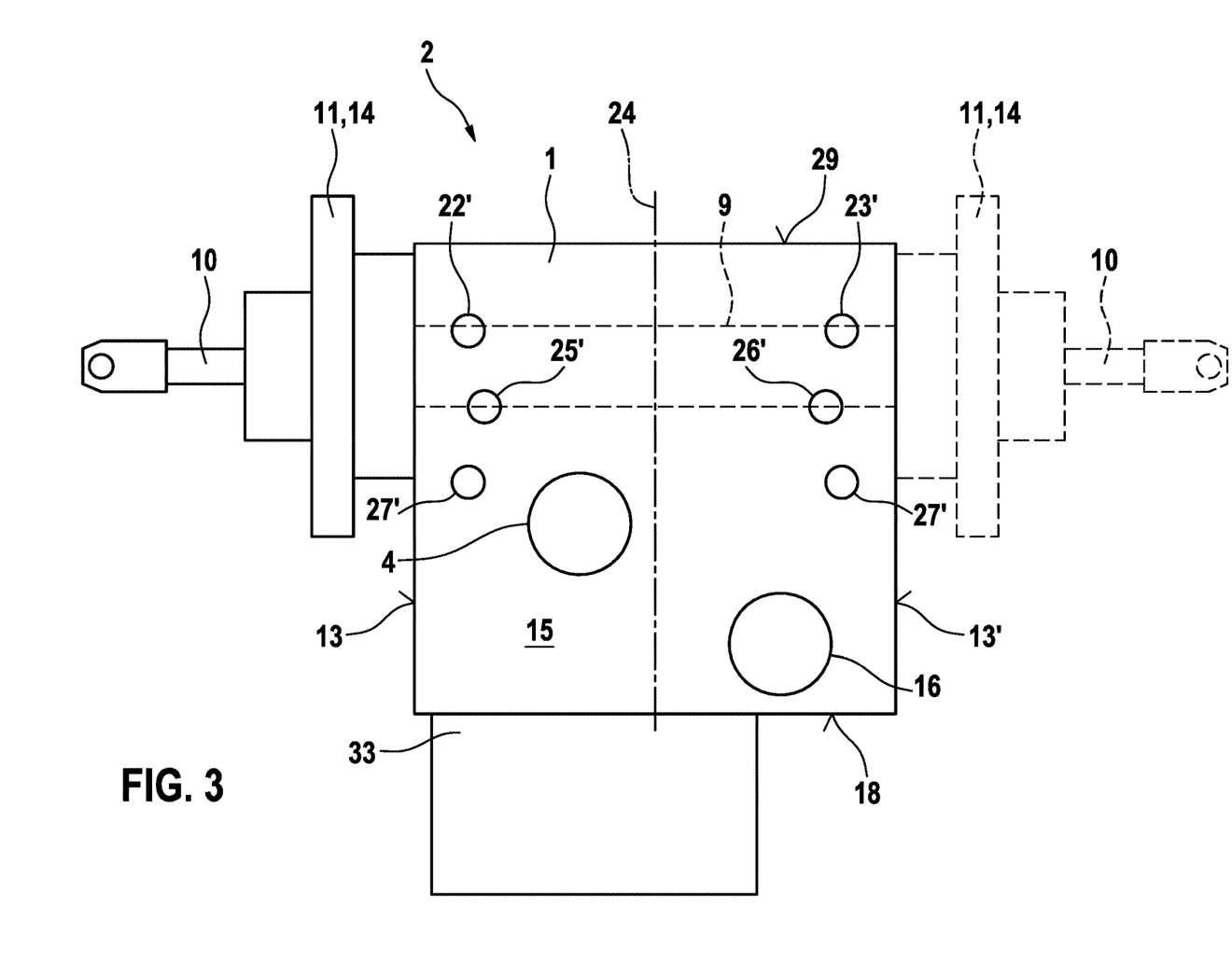
FIG. 3 shows a control unit side of the hydraulic block from FIG. 1 opposite the motor side.
Figure 4:
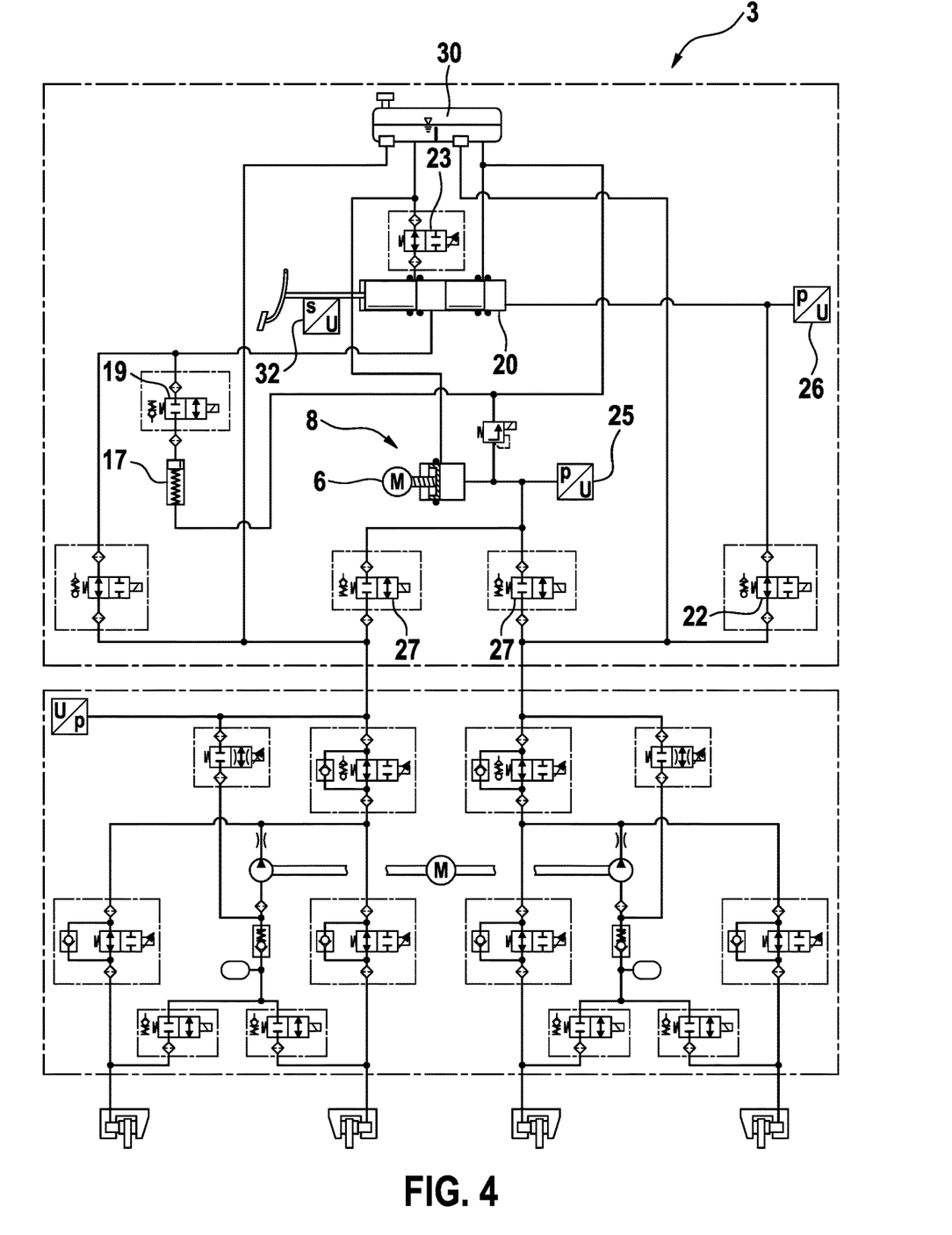
FIG. 4 shows a hydraulic circuit diagram of a hydraulic power vehicle braking system, in accordance with an example embodiment of the present invention.

FIGS. 1 through 3 show a hydraulic block 1 of a hydraulic unit 2 of a hydraulic power vehicle braking system 3 including a slip control according to the present invention from various sides. Such slip controls are, for example, anti-lock braking systems, traction control systems and/or dynamic stability controls/electronic stability programs, for which the abbreviations ABS, ASR and/or DSC/ESP are common. Slip controls are conventional and are not further elaborated here. FIG. 4 shows a hydraulic circuit diagram of power vehicle braking system 3.

In the exemplary embodiment, hydraulic block 1 is a narrow, cuboidal metal block, whose opposing long sides are virtually square. "Narrow" means that a distance between both long sides is not greater than half a length or width of the long sides. In the exemplary embodiment, the distance of the two long sides from one another is approximately one-third to one-fourth the length or width of long sides. Other side proportions are possible.

Hydraulic block 1 serves as a mechanical fastening and hydraulic interconnection of hydraulic components of the slip control, including a brake pressure control of the power vehicle braking system. Such hydraulic components are, among other things, solenoid valves, check valves, hydraulic accumulators, damper chambers and pressure sensors, which are fastened in receptacles in the hydraulic block. The receptacles are cylindrical counterbores, blind holes and/or also through-holes, which may include diameter gradations, and into which the hydraulic components are introduced and are fastened or become fastened in a pressure-tight manner, for example, as the result of a circumferential caulking. The hydraulic components may be countersunk in the receptacles or may project from hydraulic block 1. Fitted with the hydraulic components, an electric motor of a power brake pressure generator to be explained below, and an electronic control unit, hydraulic block 1 forms hydraulic unit 2 for brake pressure control and slip control of power vehicle braking system 3.

Hydraulic interconnection means that the receptacles for the hydraulic components are connected to one another by lines, which pass through hydraulic block 1 in accordance with the hydraulic circuit diagram of power vehicle braking system 3 or its slip control shown in FIG. 4. The receptacles and lines form a so-called "bore system" of hydraulic block 1, the receptacles and lines, in principle, also being capable of being produced differently than by boring. Hydraulic block 1 according to the present invention is Cartesian bored, which means that the receptacles for the hydraulic components and the lines connecting them extend in parallel and perpendicularly to one another and to sides and edges of cuboidal hydraulic block 1. Individual receptacles and/or lines may also be placed on a slant in hydraulic block 1. Hydraulic block 1 may include receptacles for all components of the vehicle braking system shown in FIG. 4 or receptacles for one portion of the components are present and receptacles for another portion of the components are provided in a further hydraulic block not depicted, which is connected by brake lines to the hydraulic block depicted.

Hydraulic block 1 according to the present invention includes a power cylinder bore 4, which passes perpendicularly through hydraulic block 1 from the one long side to the opposite other long side. Power cylinder bore 4 is used for displaceably accommodating a piston of a power brake pressure generator not depicted, which is often referred to as a plunger piston. The piston of the power brake pressure generator may be displaceable directly in the power cylinder bore 4. In the specific embodiment of the present invention represented and described, a cylinder, referred to here as power cylinder 5, is situated in power cylinder bore 4. Power cylinder 5 projects on both long sides from hydraulic block 1. This allows for a power cylinder 5, which is axially longer than the distance between the two long sides of hydraulic block 1. A cylinder sleeve may also be situated for guiding the piston in power cylinder bore 4.

To drive, i.e., to displace, the piston in the power cylinder 5, an electric motor 6 is attached coaxially to power cylinder bore 4 on the outside of one of the two long sides of hydraulic block 1, which is referred to here as motor side 7. Electric motor 6 displaces the piston via a planetary gear not visible in the drawings as a reduction gear and via a recirculating ball gear as a threaded drive also not visible. Electric motor 6, the reduction gear, the threaded drive, power cylinder 5 and the piston displaceable in power cylinder 5, form a power brake pressure generator 8 for generating a hydraulic brake pressure for a power brake application.

A main brake cylinder bore 9 is placed perpendicularly to power brake cylinder bore 4 in hydraulic block 1. "Perpendicularly" means that power brake cylinder bore 4 is placed in parallel to the two long sides, in the exemplary embodiment, at a midpoint between the two long sides in hydraulic block 1. Main brake cylinder bore 9 passes from one narrow side through to an opposite other narrow side of hydraulic block 1, which are adjacent to the two long sides and thus to motor side 7 of hydraulic block 1. Main brake cylinder bore 9 is used for displaceably accommodating one or multiple pistons of a main brake cylinder 20 not depicted (FIG. 4). A so-called primary piston or rod piston is displaced in main brake cylinder bore 9 mechanically and using muscular force with the aid of a foot brake pedal not shown via a piston rod 10 also not shown or with the aid of a hand brake lever not shown. The piston or pistons may be displaceably accommodated directly in main brake cylinder bore 9 or a cylinder or a cylinder sleeve is situated, for example pressed in, in main brake cylinder bore 9, in which the piston or the pistons of the main brake cylinder 20 is/are displaceably guided.

Main brake cylinder bore 9 and power cylinder bore 4 are cylindrical through-holes with diameter gradations and circumferential grooves, which are depicted simply as cylinders.

A fastening flange 11 is situated coaxially to main brake cylinder bore 9 at the narrow side of hydraulic block 1, through which piston rod 10 passes. As may be seen in FIG. 2, hydraulic block 1 includes screw holes 12 with internal threads for screwing on fastening flange 11, which are placed in a distributed manner around openings of main brake cylinder bore 9 in the two opposing narrow sides of hydraulic block 1. In this way, fastening flange 11 may be optionally situated at one of the two opposing narrow sides of hydraulic block 1, which are referred to here as fastening sides 13. The arrangement of fastening flange 11 at one of two fastening sides 13 is represented in FIGS. 1 and 3 with solid lines and the arrangement of fastening flange 11 at the opposite other fastening side 13 is represented with dashed lines. To differentiate, fastening side 13, at which first fastening flange 11 is depicted with solid lines, is referred to here as first fastening side 13 and opposite fastening side 13', at which fastening flange 11 is depicted with dashed lines, is referred to as second fastening side 13'. Screw holes 12 with the internal threads for screwing on fastening flange 11 may be present at both fastening sides 13, 13' or at only one of fastening sides 13, 13', which are to be used for fastening respective hydraulic block 1. A fastening of fastening flange 11 to hydraulic block 1 by means other than screwing on is possible.

It is provided to situate hydraulic block 1 with the aid of fastening flange 11 in an engine compartment at a splashboard of a motor vehicle not shown. By fastening hydraulic block 1 at first fastening side 13, motor side 7 including electric motor 6 is located on a left side of hydraulic block 1 in relation to an installation position of hydraulic block 1 or of hydraulic unit 2 in, for example, the engine compartment of the motor vehicle not shown, and by fastening hydraulic block 1 at the opposite second fastening side 13', motor side 7 including electric motor 6 is located on the right side of hydraulic block 1 in relation to the installation position. A fastening of hydraulic block 1 optionally to one of the two fastening sides 13, 13' without fastening flange 11, for example by screwing on directly at screw holes 12, is also possible.

At the long side opposite motor side 7, referred to here as control unit side 15, hydraulic block 1 includes a receptacle 16 for a pedal travel simulator 17. Receptacle 16 for pedal travel simulator 17 is a cylindrical counterbore or a cylindrical blind hole perpendicular in control unit side 15. Receptacle 16 for pedal travel simulator 17 is thus placed in parallel to power cylinder bore 4 and perpendicularly to main brake cylinder bore 9 in hydraulic block 1. In the exemplary embodiment, receptacle 16 for pedal travel simulator 17 is located between power cylinder bore 4, which is situated almost centrally in motor side 7 and control unit side 15, and one of the two fastening side 13 and close to a lower transverse side 18, which is adjacent to motor side 7, to control unit side 15 and to both fastening sides 13, and which is located below in a provided use position of hydraulic block 1 or of hydraulic unit 2.

Pedal travel simulator 17 is a piston-cylinder unit including a, for example, spring-biased piston, which is connected via a simulator valve 19 to main brake cylinder 20 (see hydraulic circuit diagram in FIG. 4). A cylindrical cup-shaped cover is placed coaxially to receptacle 16 for pedal travel simulator 17 on control unit side 15 at hydraulic block 1 which, together with the counterbore that forms receptacle 16 for pedal travel simulator 17, forms a cylinder 21 of the piston-cylinder unit of pedal travel simulator 17.

Blind holes, which may include diameter gradations, are placed in control unit side 15 of hydraulic block 15 as receptacles for solenoid valves of the brake pressure control and slip control of power vehicle braking system 3.

Hydraulic block 1 includes a receptacle 22' for a separating valve 22 (see FIG. 4), by which a brake circuit of vehicle braking system 3 is connected to main brake cylinder 20, and a receptacle 23' for a test valve 23 (FIG. 4), which is located between main brake cylinder 20 and a brake fluid reservoir 24. Receptacles 22', 23' are situated at the same height in control unit side 15, i.e., at the same distance from an upper transverse side 29 of hydraulic block 1, and in mirror image with respect to a mid-plane 24 at a midpoint between the two fastening sides 13 of hydraulic block 1. The two receptacles 22', 23' are located above an axis of main brake cylinder bore 9 and empty into this in such a way that main brake cylinder bore 9 communicates with the two receptacles 22', 23'. Main brake cylinder bore 9 also communicates with connections for a brake fluid reservoir 30. Separating valve 22 and test valve 23 include identical solenoid coils, so that these two valves 22, 23 may be exchanged in receptacles 22', 23'.

In addition, hydraulic block 1 includes two counterbores as receptacles 25', 26' for a pressure sensor 25 connected to power brake pressure generator 8 and for a pressure sensor 26 connected to main brake cylinder 20 of vehicle braking system 3 (FIG. 4). These receptacles 25', 26' are placed at the same height and lower than receptacles 22', 23' for separating valve 22 and for test valve 23 and also in mirror image with respect to mid-plane 24 in control unit side 15 of hydraulic block 1.

Placed below receptacles 25', 26' for pressure sensors 25, 26 and approximately at mid-height between upper transverse side 29 and lower transverse side 18 of hydraulic block 1 are two receptacles 27' for power valves 27, via which two brake circuits of vehicle braking system 3 are connected to power brake pressure generator 8 (FIG. 4), in mirror image with respect to mid-plane 24 in control unit side 15 of hydraulic block 1.

Valve domes 23'', 27'', which contain armatures and coils of the solenoid valves, protrude from hydraulic block 1 on control unit side 15 and may be seen in FIG. 2. Further blind holes are placed in control unit side 15 of hydraulic block 1 as receptacles for solenoid valves, which are not shown in FIGS. 1 through 3 and not explained. The solenoid valves may be seen in the hydraulic circuit diagram of FIG. 4.

In upper transverse side 29 opposite lower transverse side 18, hydraulic block 1 includes three counterbores not visible in the drawings for connecting brake fluid reservoir 30, which is set on hydraulic block 1. Upper transverse side 29 is located at the top in the provided use position of hydraulic block 1 or hydraulic unit 2.

Hydraulic block 1 includes in parallel to and close to main brake cylinder bore 9 a sensor bore 31 for a position sensor or a travel sensor 32 for a piston of main brake cylinder 20. Sensor bore 31 may be continuous from the one to the other fastening side 13 of the hydraulic block at an, in principle, arbitrary point of a circumference of main brake cylinder bore 9. Sensor bore 31 is situated preferably above or below main brake cylinder bore 9 in a mid-plane of hydraulic block 1 between motor side 7 and opposite control unit side 15. One other possibility is that there are two sensor bores 31 in parallel to main brake cylinder bore 9, which extend, starting from opposing fastening sides 13, further than to mid-plane 24 into hydraulic block 1. The two sensor bores 31 are offset from one another in the circumferential direction of main brake cylinder 9, so that they do not merge into one another. In FIG. 2, one of the two sensor bores 31 is depicted with dashed lines, which is offset to the right in the circumferential direction of main brake cylinder bore 9. Non-visible sensor bore 31 in opposite fastening side 13 is situated preferably in mirror image, i.e. on the opposite side of the mid-plane between motor side 7 and control unit side 15. A box-shaped control unit housing 33 is attached at control unit side 15 of hydraulic block 1, whose open side faces hydraulic block 1 and is sealed by hydraulic block 1. Control unit housing 33 is not depicted in FIG. 3. Control unit housing 33 covers power cylinder 5, cylinder 21 of pedal travel simulator 17, valve domes 23", 27" and pressure sensors 25, 26 and protects them from water and corrosion by a seal at control unit side 15 of hydraulic block 1.

A circuit board 34, including one or multiple integrated circuits, microprocessors and/or further electronic components, which form an electronic control unit 35, is situated in control unit housing 33. Electronic control unit 35 receives signals from, among other things, pressure sensors 25, 26 and from electric motor 6 of power brake pressure generator 8 and controls or regulates electric motor 6, solenoid valves 22, 23, 27 and similar hydraulic components of the brake pressure control and slip control.

Electronic control unit 35 is the same, regardless of to which of the two opposing fastening sides 13, 13' hydraulic block 1 is fastened. Hydraulic blocks 1 or hydraulic units 2 including different control units 35 are possible, however, the respectively used control unit 35 is the same regardless of to which of the two opposing fastening side 13, 13' hydraulic block 1 is fastened or becomes fastened. This applies in any case to the hardware of control unit 35, the software may be adapted. Hydraulic block 1 may be fastened and used with one and the same electronic control unit 35 optionally at first fastening side 13 or at opposite second fastening side 13'.

A multipole electrical plug connection 36 for electronic control unit 35 and a power supply of electric motor 6 are molded onto control unit housing 33. Plug connection 36 is located below lower transverse side 18 of hydraulic block 1 and is accessible from the direction of motor side 7 for inserting a mating plug not depicted.

Blind holes as brake line connections 37 are provided in motor side 7. The blind holes may include internal threads for connecting brake lines using screw nipples or may be unthreaded for connecting brake lines using nipples by caulking, in particular, using self-clinch nipples, which self-clinch in a pressure-tight manner when being pressed into the blind holes. A further hydraulic block not shown, which includes a portion of the hydraulic components of power vehicle braking system 3, is connectable to the brake lines, or wheel brakes are connectable to hydraulic block 1. In order for brake lines 37 to be easily accessible at hydraulic unit 2 situated, for example in the engine compartment, they are preferably far removed from fastening side 13, 13', to which hydraulic block 1 is fastened, for example, the splashboard of the motor vehicle not shown. Therefore, two brake line connections 37 are provided on a side of mid-plane of hydraulic block 1 facing away from first fastening side 13 for fastening hydraulic block 1 or hydraulic unit 2 to first fastening side 13 in FIG. 1. Due to there being too little space available on the side of mid-plane 24 facing first fastening side 13 for two brake line connections 37, hydraulic block 1 includes only one brake line connection 37 on the side of mid-plane 24 facing away from second fastening side 13', depicted in FIG. 1 with dashed lines, for fastening at its second fastening side 13'. One of the two brake line connections 37 on the side of mid-plane 24 facing second fastening side 13' is used as second brake line connection 37, specifically, brake line connection 37, which is further remote from second fastening side 13'. Brake line connection 37 closer to second fastening side 13' is omitted.

What is claimed is:

1. A hydraulic block arrangement for a hydraulic unit of a hydraulic power vehicle braking system, the arrangement comprising:
   a cuboidal hydraulic block having (a) a power cylinder bore in a motor side of the hydraulic block, (b) a main brake cylinder bore extending between first and second fastening sides of the hydraulic block, the first and second fastening sides being opposite each other and being adjacent and perpendicular to the motor side, and (c) a first fastener connecting arrangement at the first fastening side and a second fastener connecting arrangement at the second fastening side;
   an electric motor situated at the motor side covering an opening of the power cylinder bore;
   a piston rod that is shiftable by a brake pedal or lever; and
   a fastener mechanically fastened to the first fastener connecting arrangement at the first fastening side of the hydraulic block;
   wherein the fastener:
      is configured to also be mechanically fastened to the second fastener connecting arrangement at the second fastening side; and
      includes a fastening flange that has an opening therethrough aligned with the main brake cylinder bore and through which the piston rod is passable into the main brake cylinder bore from whichever of the first and second fastening sides to which the fastener is mechanically fastened.

2. The hydraulic block arrangement as recited in claim 1, wherein the hydraulic block includes first and second receptacles for respective power valves in a control unit side of the hydraulic block opposite the motor side, the first and second receptacles being opposite each other in relation to a mid-plane between the first and second fastening sides.

3. The hydraulic block arrangement as recited in claim 2, wherein the hydraulic block includes a third receptacle for a test valve in the control unit side opposite the motor side and a fourth receptacle for a separating valve also in the control unit side, the third and fourth receptacles being opposite to each other in relation to the mid-plane between the first and second fastening sides.

4. The hydraulic block arrangement as recited in claim 3, wherein the hydraulic block includes connections for a brake fluid reservoir in an upper transverse side adjacent to each of the motor side, the control unit side, and the first and second fastening sides.

5. The hydraulic block arrangement as recited in claim 4, wherein the main brake cylinder bore communicates with the third receptacle, and/or with the fourth receptacle, and/or with the connections for the brake fluid reservoir.

6. The hydraulic block arrangement as recited in claim 4, wherein the hydraulic block includes an electrical plug connection at a lower transverse side opposite the upper transverse side.

7. The hydraulic block arrangement as recited in claim 2, wherein the hydraulic block includes third and fourth receptacles for respective pressure sensors in the control unit side of the hydraulic block opposite the motor side, the third and fourth receptacles being opposite to each other in relation to the mid-plane between the first and second fastening sides.

8. The hydraulic block arrangement as recited in claim 2, wherein the hydraulic block includes a third receptacle for a pedal travel simulator in the control unit side of the hydraulic block opposite the motor side.

9. The hydraulic block arrangement as recited in claim 2, wherein the hydraulic block includes an electronic control unit on the control unit side opposite the motor side.

10. The hydraulic block arrangement as recited in claim 1, wherein the hydraulic block includes a sensor bore for a position sensor or a travel sensor for the main brake cylinder, the main brake cylinder bore and the sensor bore extending parallel to each other.

11. A hydraulic block arrangement for a hydraulic unit of a hydraulic power vehicle braking system, the arrangement comprising:
- a fastener;
- a cuboidal hydraulic block that includes (a) a power cylinder bore in a motor side of the hydraulic block, (b) a receptacle that is in a control unit side of the cuboidal hydraulic block and is structured to accommodate therein a pedal travel simulator, (c) a first fastener connecting arrangement at a first fastening side of the hydraulic block, and (d) a second fastener connecting arrangement at a second fastening side of the hydraulic block that is opposite the first fastening side, wherein:
  - the fastener is mechanically fastened to the first connecting arrangement such that the cuboidal hydraulic block is mechanically attachable to a splashboard of an engine compartment of a vehicle;
  - the second connecting arrangement is structured for the fastener to also mechanically fasten to the second connecting arrangement when not mechanically fastened to the first connecting arrangement; and
  - the motor side and the control unit side are opposite each other and are perpendicular to and extend between the first and second fastening sides; and
- an electric motor situated at the motor side covering an opening of the power cylinder bore.

12. The hydraulic block arrangement as recited in claim 11, further comprising:
- a control unit; and
- a control unit housing in which the control unit is housed and that is attached to the control unit side of the cuboidal hydraulic block with an open side of the control unit housing facing and being sealed by the cuboidal hydraulic block, such that the control unit housing covers the receptacle structured to accommodate the pedal travel simulator.

13. The hydraulic block arrangement as recited in claim 11, further comprising:
- a piston rod that is shiftable by a brake pedal or lever, wherein the fastener includes a fastening flange (a) that has an opening therethrough aligned with a main brake cylinder bore that extends through the cuboidal hydraulic block between the first and second fastening sides and (b) through which the piston rod is passable at any time into the main brake cylinder bore from whichever of the first and second fastening sides to which the fastener is mechanically fastened at the respective time.

* * * * *